(12) United States Patent
Shimura

(10) Patent No.: US 6,370,687 B1
(45) Date of Patent: Apr. 9, 2002

(54) NETWORK COMPUTER SYSTEM AND SUBSTITUTE COMPILE SERVER

(75) Inventor: Kouya Shimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/440,706

(22) Filed: Nov. 16, 1999

(30) Foreign Application Priority Data

Jan. 21, 1999 (JP) ............................................. 11-013011

(51) Int. Cl.[7] ................................................ G06F 9/45
(52) U.S. Cl. ...................... 717/146; 717/148; 709/203
(58) Field of Search ............................ 717/5, 7, 9, 11, 717/138, 140, 146, 147, 148, 151, 176, 177, 178; 709/200, 201, 202, 203, 217, 218, 219; 370/466

(56) References Cited

U.S. PATENT DOCUMENTS

| | | | | |
|---|---|---|---|---|
| 6,091,412 A | * | 7/2000 | Simonoff et al. ............ 345/335 |
| 6,128,315 A | * | 10/2000 | Takeuchi ..................... 370/466 |
| 6,134,603 A | * | 10/2000 | Jones et al. .................. 709/330 |
| 6,289,506 B1 | * | 9/2001 | Kwong et al. ................... 717/9 |
| 6,304,893 B1 | * | 10/2001 | Gish .......................... 709/203 |
| 6,324,685 B1 | * | 11/2001 | Balassanian .................... 717/5 |

OTHER PUBLICATIONS

Karpinski, "Compilers speed Java, but there is a trade-off", Internetweek, Apr. 27, 1998, pp 1–2.*
Wollrath, "Distributed programming in Java", Performance computing, Jan. 1999, pp 25–46.*
Kobielus, Application adventure, Intranet Network World, Jun. 1998, pp 16–20.*
North, "Java-enabled databases and adaptive servers", Web Techniques, Sep. 1998, pp 20–26.*

* cited by examiner

Primary Examiner—Kakali Chaki
(74) Attorney, Agent, or Firm—Staas & Halsey LLP

(57) ABSTRACT

A client executes a virtual machine computer program lying on a network. In response to a request from a client, a substitute compile server accepts the virtual machine computer program from the network and compiles it for the delivery to the requester client.

12 Claims, 12 Drawing Sheets

F I G. 1
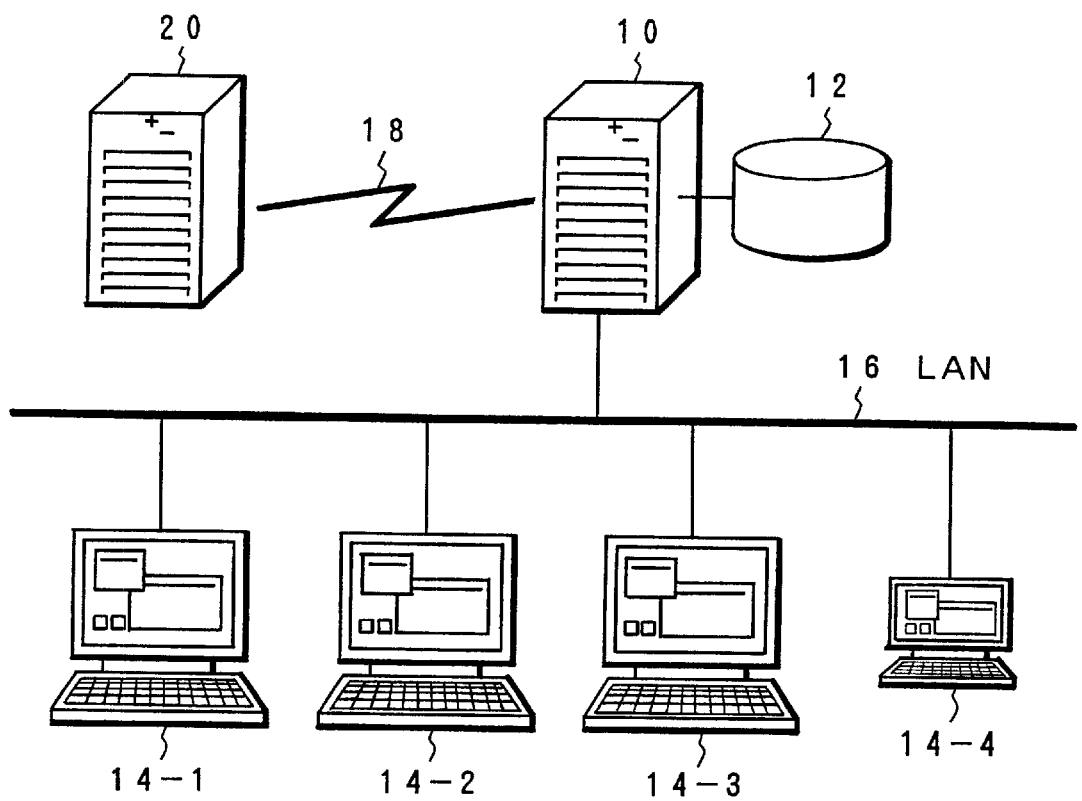

26 CONTROL MEMORY

| CLIENT NAME | EXECUTE FORM |
|---|---|
| A | α |
| B | β |
| C | γ |
| D | α |

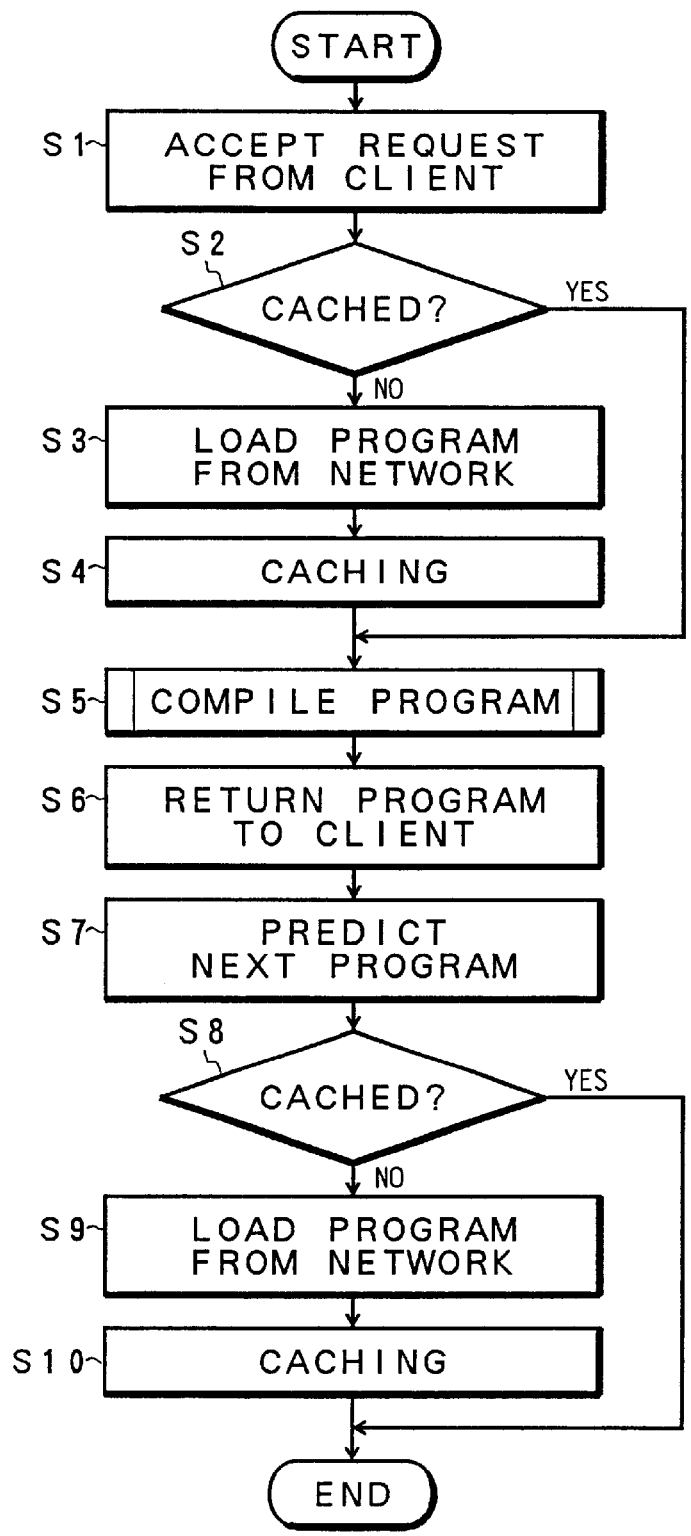
F I G. 1 4

NETWORK COMPUTER SYSTEM AND SUBSTITUTE COMPILE SERVER

BACKGROUND OF THE INVENTION

1. Field of the Invention

The present invention relates generally to a network computer system in which virtual machine computer programs on a network are accepted and executed by clients as well as to a substitute compile server, and more particularly to a network computer system and a substitute compile server which accepts the virtual machine computer programs from the network and compiles the same for the delivery to clients that have issued requests.

2. Description of the Related Arts

With the recent spread of the internet, network computer systems for executing programs via networks have been put to practice use. Java language in particular is an object-oriented language and is subjected to a rapid spread due to some reasons including non-limitation to its platform providing the execution environment and executability of the programs on Web server pages. Java programs described in such Java language are distributed in the form of byte codes which are programs of Java Virtual Machine (JVM) permitting use of any platforms. This interferes with direct execution by the client's computers, so that the execution of the Java programs necessitates emulation of the Java virtual machine codes by interpreter method on the client side. The interpreter method provides an emulation using a software for sequential interpretation of the byte codes and tends to induce a delayed execution as compared with the other languages. A possible solution to this may be a method using JIT (Just In Time) compilers on the client side. Previous to loading the byte code programs from the network to execute the same, the JIT compiler compiles the byte codes into native codes of the client machine, to thereby allow a direct execution by the client hardware, achieving a high-speed execution.

The following is a flow of basic processings in the case of using a Proxy server. Typically, by use of http protocol, a plurality of clients connected to a LAN sends to the Proxy server a request to acquire pages, images, programs, etc., of the Web server. When a client issues a request for example, the Proxy server makes a check to see whether the requested data is retained on a cache such as a hard disk, and if not it accesses the Web server by way of the external network to acquire the necessary data. The Proxy server retains the data acquired from the Web server on the cache such as the hard disk, while simultaneously it returns the same to the client that has issued the request. In case the data is retained on the cache, it is fetched from the cache and is returned to the client. Up until now, for this reason, when the client executes the Java programs lying in the Web server on the network, a client which has accepted a Java program from the Proxy server executes the Java program while compiling the same by use of the JIT compiler.

In case of providing the JIT compiler on the client side as in the prior art, however, there is required a time for the client to compile the Java program byte codes, which will affect the execution of the program.

Above all, in such an interactive environment having bidirectional data flow as to allow the request from the client to be returned to the server for processing or the results processed by the client to be delivered to the server, instead of the unidirectional data flow from the server to the client, it is essential to speed up the program rise time or response, so that much time is not to be allocated to the compilation.

Furthermore, in order to speed up the execution of the programs it is necessary to perform a complicate optimization upon the compilation by the JIT compiler, and the complicated optimization may often result in an elongated compilation time. Alternatively, if the optimization is not carried out, then the compilation time is speeded up but the execution time is elongated, thus resulting a trade-off.

SUMMARY OF THE INVENTION

According to the present invention, a compiling function is imparted to a substitute server so that a computer system and a substitute compile server are provided which allows a client's high-speed execution of a virtual machine computer program lying on a network.

The present invention provides a network computer system comprising a client for executing a virtual machine computer program lying on a network; and a substitute compile server for accepting the virtual machine computer program from the network in response to a request from the client, the substitute compile server compiling accepted the virtual machine computer program for the delivery to the client that has issued the request. In this manner, the present invention provides a high-speed substitute compile server in charge of JIT compiling on the client side, to achieve a rapid execution of the program by the client. As long as the substitute compile server has a sufficiently high speed in this case, any complicate optimization could be done upon the compilation, ensuring a further improvement in the client's execution speed.

If, because of a difference between processors or the like used, the substitute compile server has a different execute form from that of the client, it compiles a virtual machine computer program in compliance with the execute form of the client. For example, the substitute compile server grasps the execute form of the client in advance so that it compiles the virtual machine computer program depending on the execute form of the requester client. The substitute compile server may compile the virtual machine computer program depending on the execute form requested by the client. The substitute compile server, when accepting the virtual machine computer program from the network, may perform compilations based on types of execute forms of connectable clients and may deliver compiled programs having a plurality of execute forms to the client, the substitute compile server allowing the client that has issued the request to select a compiled program in conformity with its own execute form. The substitute compile server delivers the compiled program to the client that has issued the request while simultaneously retaining the same on a cache, the substitute compile server delivering the compiled program retained on the cache in response to a request from the client. For this reason, even though the substitute compile server is not of a sufficiently high speed, the thus compiled program may be retained on the cache so that the second or later execution becomes feasible at a high speed although the first execution is time consuming.

The substitute compile server upon a request from the client predicts a virtual machine computer program to be next requested by the client and accepts the same from the network, the substitute compile server compiling the virtual machine computer program to be next requested, previous to retention on the cache. Such a predicting compilation ensures a higher speed execution by the client.

The substitute compile server retains on a cache the virtual machine computer program received from the network so that upon a request from a client the substitute compile server compiles the virtual machine computer program retained on the cache and delivers the same to the client. This reduces the storage capacity of the cache.

In this case as well, the substitute compile server upon a request from a client accepts from the network a virtual machine computer program requested as well as a virtual machine computer program predicted to be next requested by the client, the substitute compile server retaining two the virtual machine computer programs on the cache. Previous to the delivery, the substitute compile server compiles a byte code accepted in the form of the machine computer program into a machine code (native code) conforming to an execute form of the client that has issued the request.

The present invention also provides a substitute compile server. The substitute compile server comprises a controller for accepting, in response to a request from a client to execute a virtual machine computer program lying on a network, requested the computer program from the network; and a compile unit for compiling the program accepted by the controller, to deliver the same to the client that has issued the request. The substitute compile server may further comprise a cache for retaining the program compiled by the compile unit so that upon a request from the client the compiled program retained thereon is delivered to the client that has issued the request.

The above and other objects, aspects, features and advantages of the present invention will become more apparent from the following detailed description with reference to the accompanying drawings.

BRIEF DESCRIPTION OF THE DRAWINGS

FIG. 1 is an explanatory diagram of a network configuration in accordance with the present invention;

FIG. 14 is a flowchart of the processing actions effected by the substitute compile server of FIG. 2, in which the program requested by the client is predicted and retained in the caches of FIG. 12.

DETAILED DESCRIPTION OF THE PREFERRED EMBODIMENTS

FIG. 1 illustrates a system configuration of a network computer system in accordance with the present invention.

A substitute compile server 10 is associated with clients 14-1, 14-2, 14-3 and 14-4 which are connected with a LAN 16, the server 10 providing an access to a Web server 20 on a network 18 such as the internet. The substitute compile server 10 can be a Proxy server having a function of compiling Java program in the form of a virtual machine computer program provided by the Web server 20 in response to a request from the clients 14-1 to 14-4. A cache 12 using a hard disk or the like is connected to the substitute compile server 10.

Figure 2:
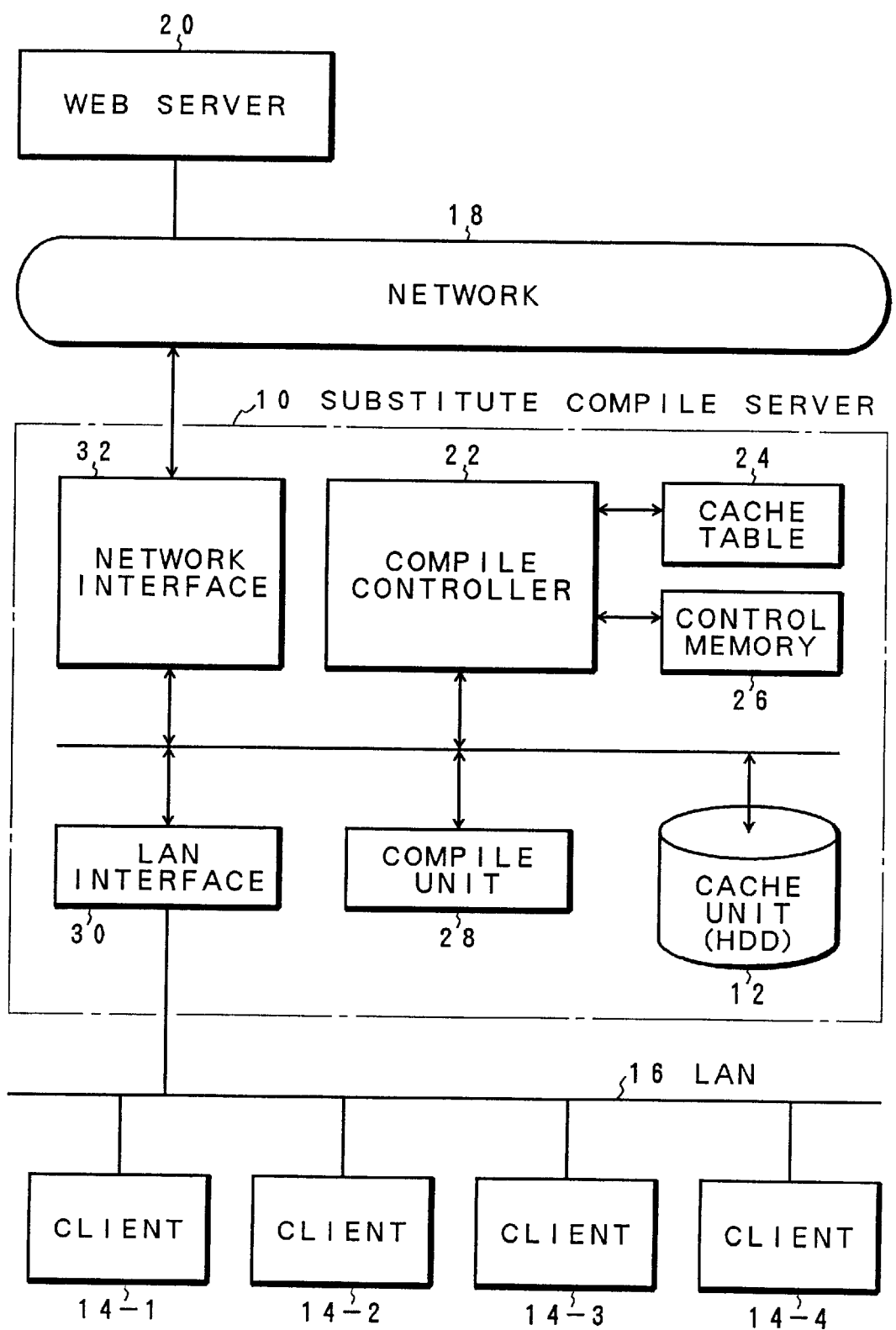
FIG. 2 is a block diagram of system functions of the present invention.

FIG. 2 is a function block diagram of the substitute compile server 10 in accordance with the present invention provided in the network computer system of FIG. 1. The substitute compile server 10 using the Proxy server comprises a compile controller 22, a cache table 24, a control memory 26, a compile unit 28, a LAN interface 30 and a network interface 32. Herein, the Web server 20 on the network 18 includes the Java program in the form of the virtual machine computer program prepared as an applet on the web page, whereas the clients 14-1 to 14-4 are provided with the hot Java browsers so as to provide an environment for emulating the byte code of the Java program in the form of the virtual machine computer program received through the access to the Web server 20 to thereby execute it with the interpreter method. When the compile controller 22 of the substitute compile server 10 accepts a request to acquire the Java program using the http protocol from the clients 14-1 to 14-4, it refers to the cache table 24 to see whether the compile program of the Java program requested by the cache unit 12 is retained, and, if not, it sends a request to deliver the Java program to the Web server 20 by way of the network 18. When the Java program is delivered from the Web server 20 to the substitute compile server 10, the compile controller 22 provides a control of the compile unit 28 so as to allow the byte code of the Java program delivered from the Web server 20 to be compiled into a machine code of native environment conforming to the execution environment of the client issuing the request at that time. Simultaneously, the compile controller 22 retains the thus compiled Java program in the cache unit 12 and enters the cache results into the cache table 24.

Figure 3:
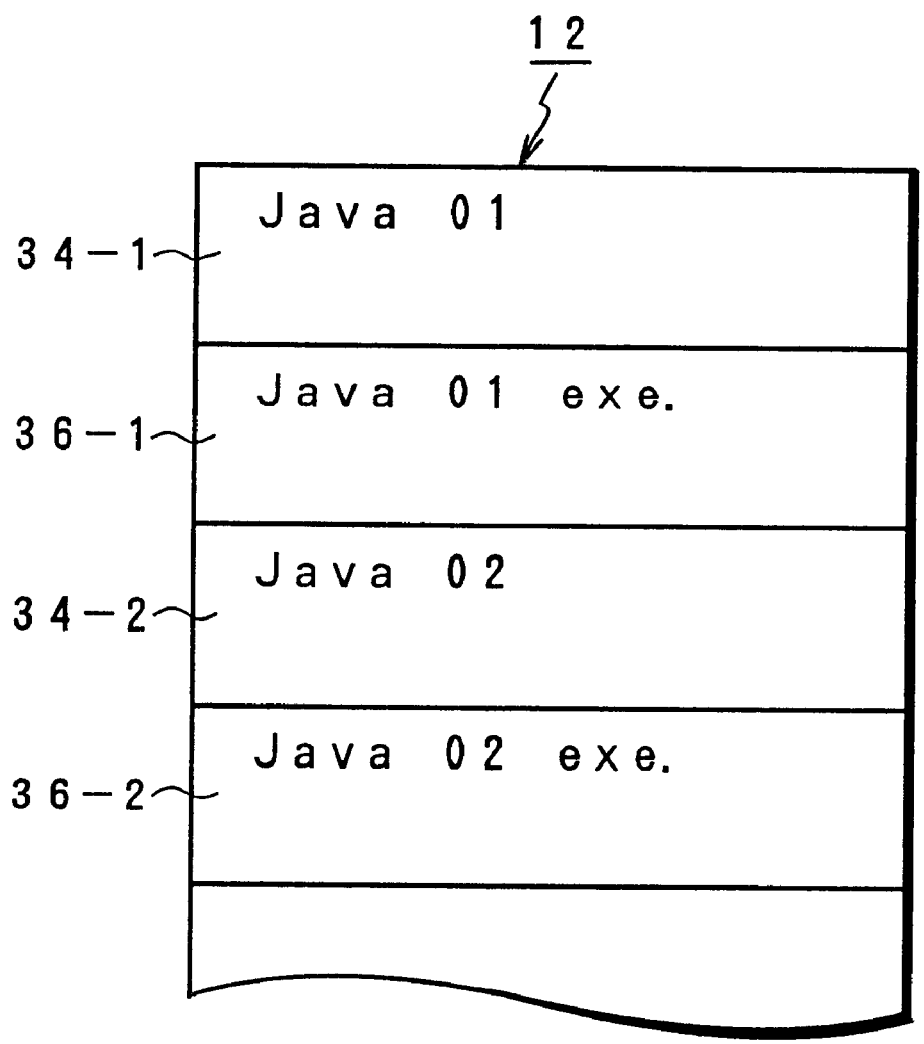
FIG. 3 is an explanatory diagram of a cache provided in a substitute compile server of FIG. 2.
Figures 4, 5:
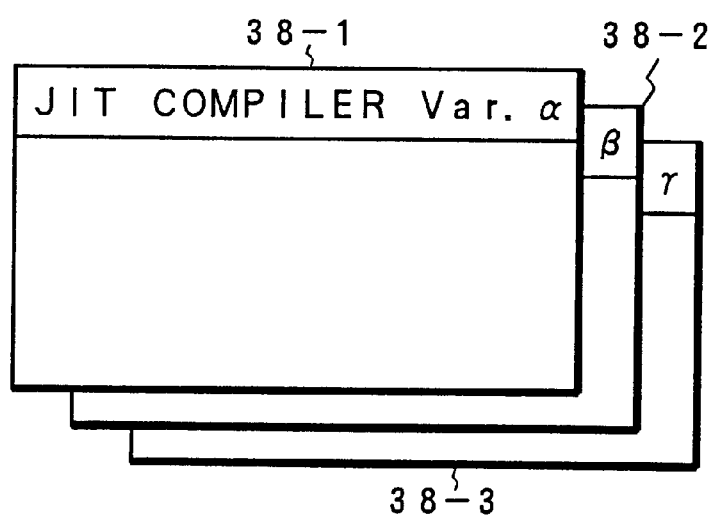
FIG. 4 is an explanatory diagram of a control memory provided in the substitute compile server of FIG. 2.
FIG. 5 is an explanatory diagram of a compile unit provided in the substitute compile server of FIG. 2.

FIG. 3 illustrates an example of the cache unit 12 provided in the substitute compile server 10 of FIG. 2. Retained in this example are precompiled Java programs 34-1 and 34-2 delivered from the Web server 20 as well as compiled Java programs 36-1 and 36-2 which have been compiled into native codes by the compile unit 28. The control memory 26 associated with the compile controller 22 of the substitute compile server 10 of FIG. 2 stores as in FIG. 4 for example names of the servers of the clients 14-1 to 14-4 accessible via the LAN 16 to the substitute compile server 10, and correlations of execute forms determined by the processor or the like for executing the Java program on the network. Client names A, B, C and D in the control memory 26 can be for example a network address "http:WWW.A.co.jp/", and the execute forms α, β, γ can be processor names of the clients 14-1 to 14-4, e.g., identifiers such as SPARCV8, X86, Intel486, etc. When accepting a request to deliver the Java program from the client side, the compile controller 22 of the substitute compile server 10 recognizes the execute form of the client through the reference to the control memory 26 based on the client server names and recognizes the native code of the execution environment in which the compile unit 28 compiles from the byte code of the Java program. Correspondent to such client execute forms, the compile unit 28 as shown in FIG. 5 includes JIT compilers (JIT compile programs) 38-1, 38-2 and 38-3 which have been prepared in advance and which correspond respectively to client execute forms α, β, and γ, so that it selects a JIT compiler in the execute form corresponding to the requested server name to thereby carry out compiling from a Java program byte code into a native code in the corresponding execute form. For example, the JIT compiler 38-1 is a compiler for translating the Java byte code into a SPARCV8 native code, the JIT compiler 38-2 is a compiler for translating the Java byte code into an X86 native code, and the JIT compiler 38-3 is a compiler for translating the Java byte code into an Intel486 native code. Naturally, besides the JIT compilers 38-1 to 38-3, additional JIT compilers could appropriately be provided if necessary, in response to the type of the client machine in which is installed a hot Java browser for providing an execution environment for the Java virtual machine computer program.

Figure 6:
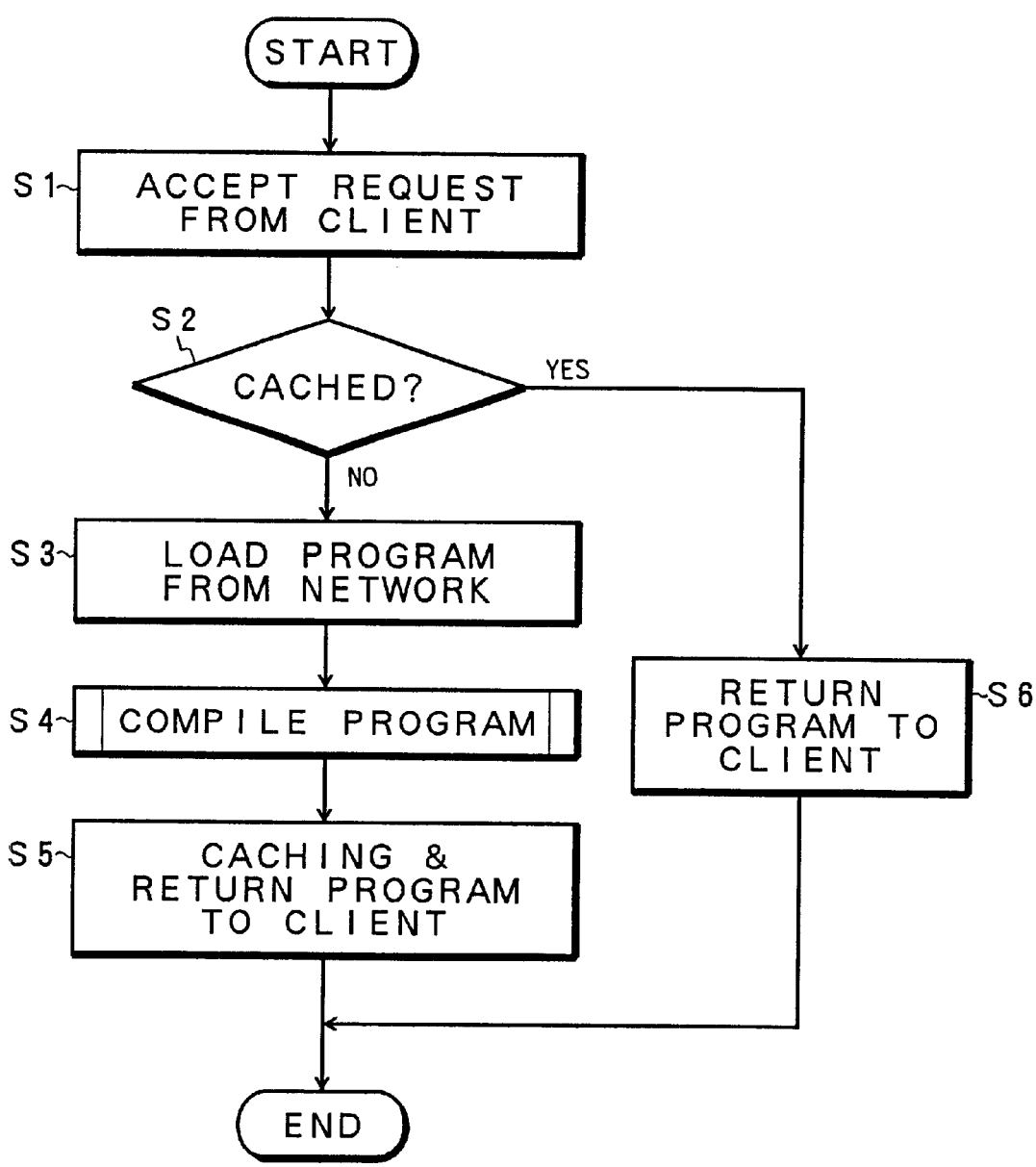
FIG. 6 is a flowchart of processing actions effected by the substitute compile server of FIG. 2.

FIG. 6 is a flowchart of processing actions effected by the substitute compile server 10 of FIG. 2. If in step S1 the compile server 10 accepts a request for access to a Java program of the Web server 20 from the client 14-1 for example, then in step S2 a check is made to see whether the requested Java program is retained in the cache unit 12. More specifically, in response to the request for access to the Java program from the client 14-1, the compile controller 22 refers to the control memory 26 based on the name of the request issued client to recognize its execute form and then refers to the cache table 24 to see whether any compiled Java program conforming to the execute form of the client lies on the cache unit 12. If no compiled Java program lies on the cache unit 12, by way of the network interface 32 the compile controller 22 posts the Web server 20 on the network 18 on the program request accepted from the client 14-1 upon the reception of this program request, the Web server 20 returns the corresponding Java program, i.e., applet to the substitute compile server 10. When accepting the requested Java program from the Web server 20, the compile controller 22 of the substitute compile server 10 delivers the Java program to the compile unit 28. Furthermore, the compile controller 22 specifies one of the plurality of JIT compilers as shown in FIG. 5 corresponding to the execute form correspondent to the client name of the requesting client 14-1 which has been recognized through the reference to the control memory, and it compiles the Java program in step S4. After having been translated and optimized on a method-to-method basis into a native code in the execute form of the requesting client 14-1 by the compile unit 28, the compiled Java program is cached in the cache unit 12. At the same time, the compiled Java program is returned via the LAN interface 30 to the requesting client 14-1 in which the Java program comprised of the compiled native code is run. The Java program cached in the cache unit 12 includes as shown in FIG. 3 both the precompiled Java program received from the Web server 20 and the compiled Java program which has been compiled in the compile unit 28. Between the two the compiled Java program is a program of native code corresponding to the execute form of the requesting client, after caching it responds to a request from the client having the same execute form. On the contrary, in the event of a request of the same Java program from the client having a different execute form, the compile controller 22 reads the precompiled Java program stored in the cache unit 12 and selects a JIT compiler which corresponds to the execute form of the client issuing the request at that time, to perform compiling. The compile controller 22 then returns the thus compiled Java program to the requester and simultaneously retains in the cache unit 12 the Java program translated into a native code in a different execute form. On the contrary, if the Java program requested by the client 14-1 is cached in the cache unit 12 in step S2 of FIG. 6, then the procedure advances to step S6 in which the compiled Java program stored in the cache unit 12 is read out and returned to the client 14-1. In cases where the Java program requested by the client side lies on the cache unit 14 resulting in a cache hit in this manner, there are no needs for the request for the Java program to the Web server 20 as well as for the compilation of the delivered Java program, so that the substitute compile server 10 can immediately return the compiled Java program to the requester client for the execution therein. Thus, the functions of the JIT compilers are implemented on the server side by means of the substitute compile server 10 of the present invention in this manner. Then, in response to a request for the Java program from a client to the Web server on the network, the substitute compile server 10 returns to the client the Java program which has been compiled and optimized into a native code conforming to the execute form of the requester client. Furthermore, by using as the substitute compile server 10 a high-performance machine such as the Proxy server, it is possible to remarkably reduce the processing time taken for the compilation and optimization of the Java program. This results in a significant reduction of the processing time taken from the request of the Java program up to the execution, achieving a high-speed execution as compared with the case of execution of the Java program in the interpreter method. Furthermore, since the Java program is compiled and returned to the requester client by use of the substitute compile server 10, it is possible to obtain an execution speed equal to or higher than the machine capable of having the JIT compiler, even though the client is so small-sized a machine as to be unable to have any JIT compiler. In addition, the substitute compile server 10 caches the compiled Java program in the cache unit so that in response to requests for the same Java program from the second time onward it can read out the same to return to the client for the immediate execution.

In particular, by caching the compiled Java programs in the cache unit in an interactive action environment in which the Web server and the client interchange the programs and data, it is possible to minimize the time required for the compilation, thereby reducing the program rise time and response time.

Figure 7:
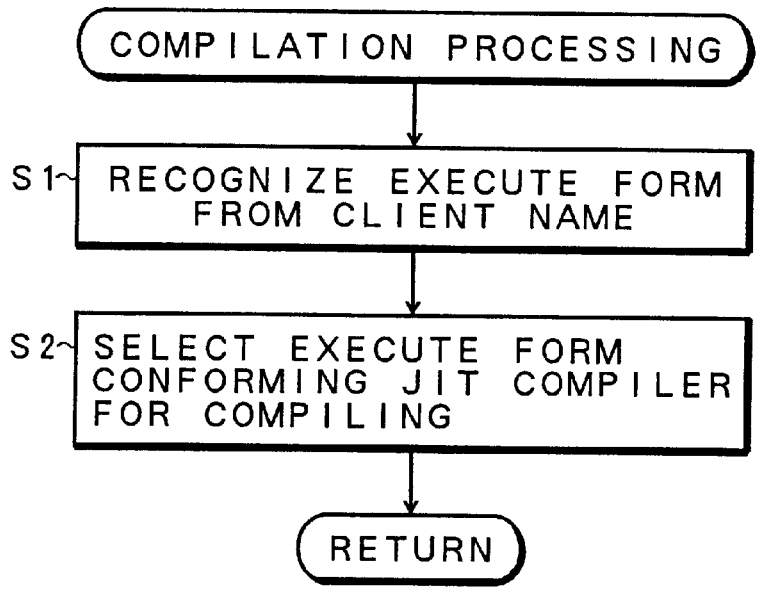
FIG. 7 is a flowchart of the compilation processing of FIG. 6 in which the execute forms are recognized from the client names.

FIG. 7 illustrates the detail of the Java program compilation processing effected by the compile unit 28 of FIG. 2 in step S4 of FIG. 6. In this compilation processing, the control memory 26 of FIG. 4 is utilized to recognize the execute form from the name of the requester client. At that time, the compile unit 28 contains a plurality of previously prepared JIT compilers 38-1, 38-2 and 38-3 conforming to the execute forms of the clients as shown in FIG. 5. For this reason, the compile unit 28 selects a JIT compiler conforming to the execute form recognized in step S1, to execute the compilation of the Java program.

Figure 8:
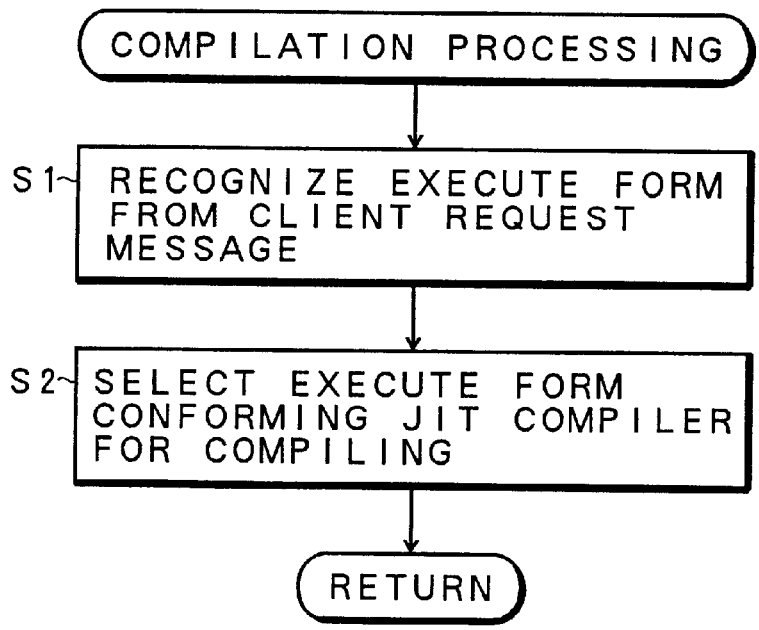
FIG. 8 is a flowchart of the compilation processing of FIG. 6 in which the execute forms are recognized from the client requests.

FIG. 8 is a flowchart of another embodiment of the Java program compilation in step S4 of FIG. 6. In this compilation processing, a program request message from a client is analyzed to recognize the execute form of the client in step S1. This case eliminates the need for the control memory 26 as shown in FIG. 4. Then the procedure advances to step S2 in which the compile unit 28 selects a JIT compiler conforming to the client execute form recognized in step S1 to execute the compilation of the Java program.

Figure 9:
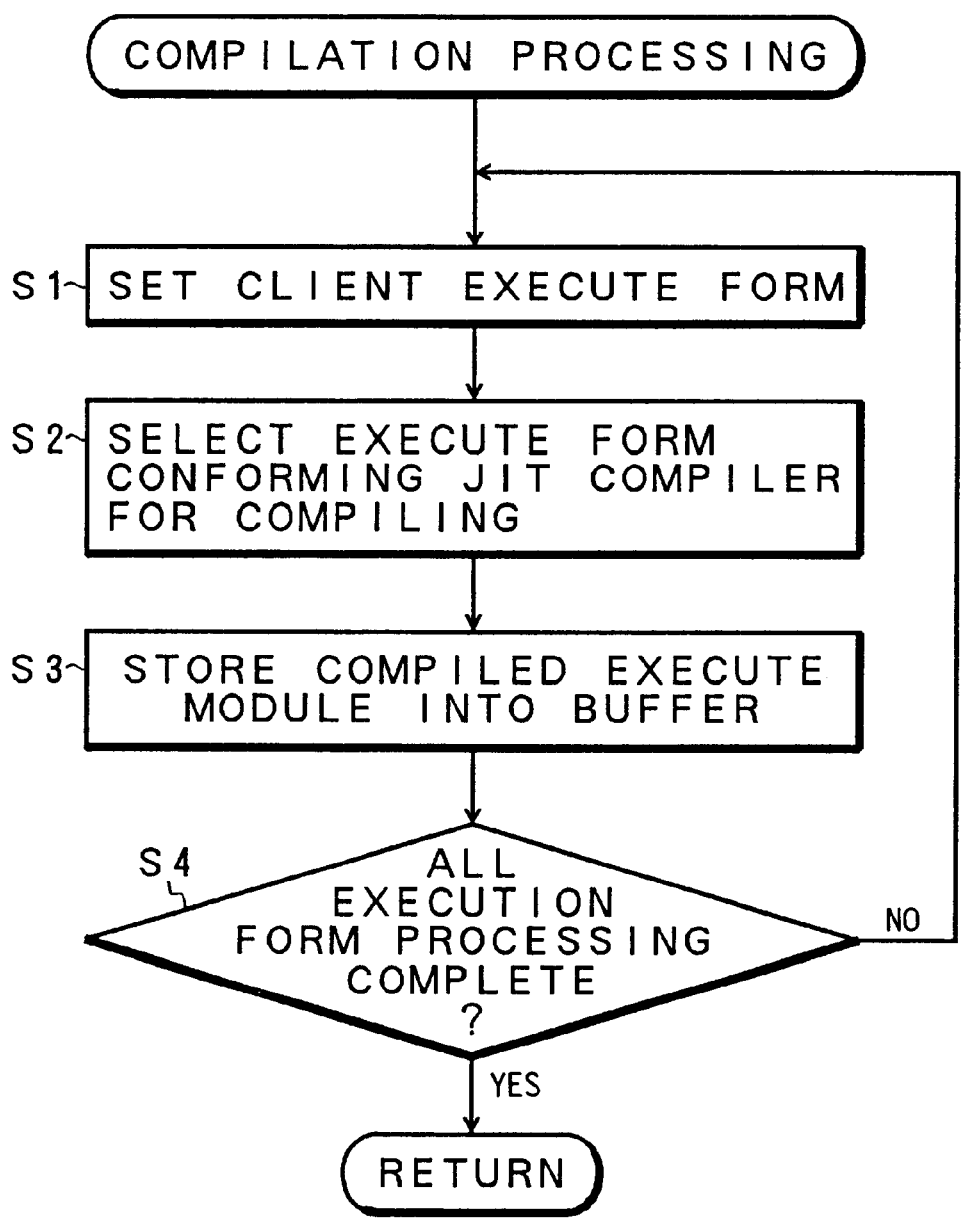
FIG. 9 is a flowchart of the compilation processing of FIG. 6 in which the compilation is carried out on all of the execute forms.

FIG. 9 illustrates a further embodiment of the compilation processing effected by the compile unit 28 in step S4 of FIG. 6. This embodiment is characterized in that translation is made into a native code conforming to all execute forms of the client machines connectable to the substitute compile server 10, the result of which is returned to the client side. More specifically, in step S1 a previously determined specific client execute form is established without any direct relation to the requester client. Then in step S2, selection is made of a JIT compiler conforming to this execute form for the compilation into its native code, and in step S3 the thus compiled execute module is stored in the buffer. Then in step S4 a check is made to see whether all execute form compilation processing is complete or not, and if not, the procedure goes back to step S1 in which the next client execute form is established so that selection is made of a JIT compiler conforming to the execute form for the compilation into its native code, after which in step S3 the execute module is stored in the buffer. When in step S4 the all client execute form compilation processing has been completed, the compile unit 28 returns to the requester client the execute modules, i.e., the compiled Java programs, of native codes conforming to each execute form stored in the buffer at that time. Upon the acceptance of the delivery of the compiled Java programs having native codes of a plurality of different types of execute forms in this manner, the client selects and run a compiled Java program of a native code conforming to its own execute form. FIG. 9 is an explanatory diagram of the further compilation processing effected in the substitute compile server of FIG. 2. This processing is characterized in that in addition to the compilation of the Java program requested by the client, a Java program to be requested next to the requested Java program is predicted and is previously compiled.

Figure 10:
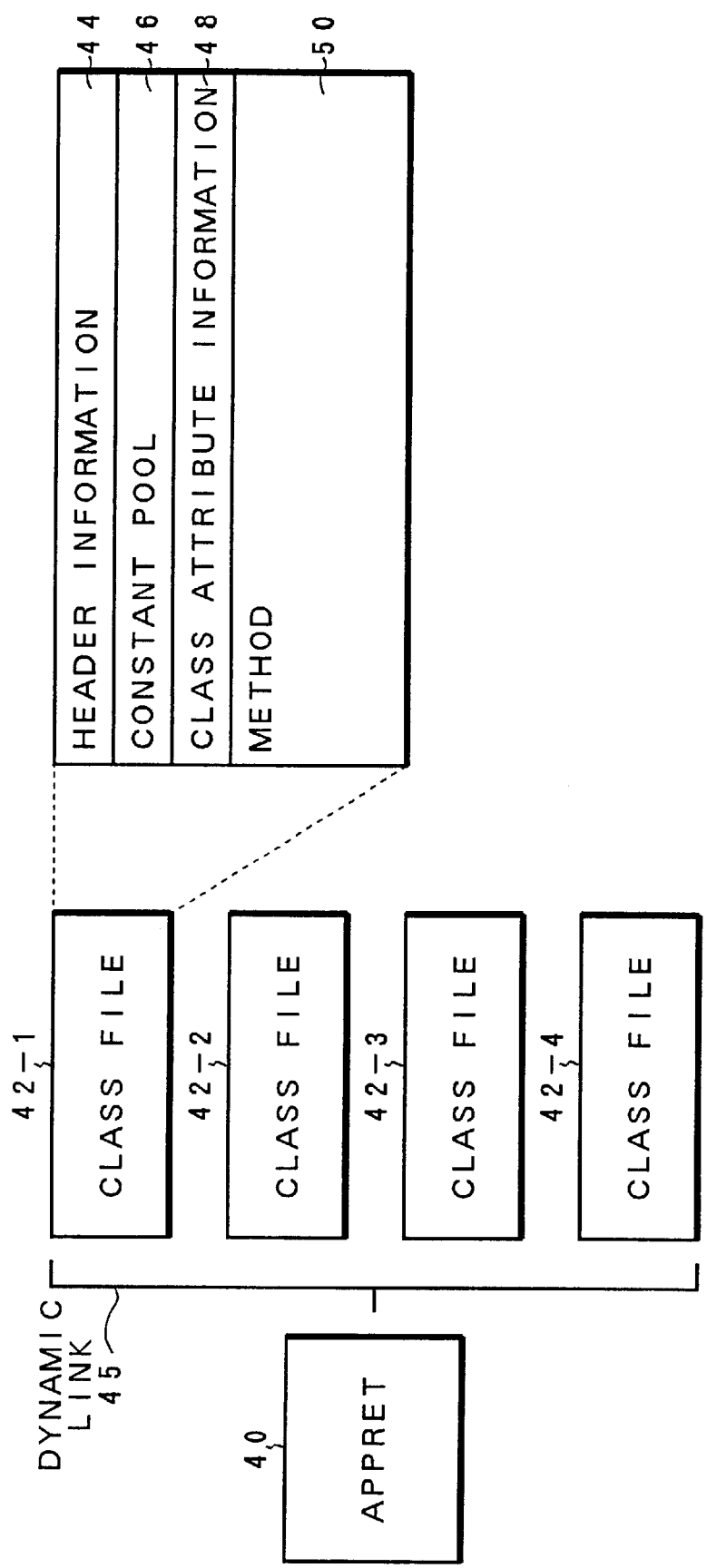
FIG. 10 is an explanatory diagram of the dynamic link between class files and an applet for use in the prediction of a program requested by a client.

FIG. 10 schematically shows a dynamic link between an applet on the Web server 20 subjected to a request from the client and a plurality of class files. The applet 40 provided on the Web server 20 is capable of being associated with the dynamic link 45 for dynamically allocating four class files 42-1 to 42-4 for example. As can be seen by the class file 42-1 in a representative manner, each of the class files 42-1 to 42-4 consists of header information 44, a constant pool 46, a class attribute information 48 and a method 50. The header information 44 includes 0xCAFEBABE version number. The constant pool 46 includes information to be statically prepared for the class file 42-1. The class attribute information 48 includes information such as an access attribute, a super class, an interface definition, etc. The method 50 is a binary program including specific byte codes as client Java virtual machine instruction codes. The client side first makes a request for a Java program of the class file 42-1 of the class files 42-1 to 42-4 allocated by the dynamic link 45 to the applet 40, so that the class file 42-1 is compiled by the substitute compile server 10 and is returned to the client side for execution. At that time, the compile controller 22 of the substitute compile server 10 makes a check on the dynamic link 45 between the applet 40 and the class file 42-1 which is a first compiled request Java program in order to predict the next program request of the class file 42-2. A request for the class file 42-2 program is thus sent to the Web server 20 even in the absence of any request from the client side. Then the compile unit 28 selects a JIT compiler corresponding to the execute form of the client which has issued the request for the class file 42-1, and the class file 42-2 is compiled into a native code and is cached in the cache unit 12. By virtue of compilation and caching based on the prediction of the next Java program in the substitute compile server 10 in this manner, if the client side makes a request for the class file 42-2 with the successful prediction, then the compiled Java program can be executed at a high speed in an immediate response to the program request from the client side since that program has already been compiled and retained on the cache unit 12. In the presence of the request for the class file 42-2, then the same dynamic link 45 is analyzed to predict the next class file 42-3 to accept a program from the Web server 20 for compilation, after which it is cached in the cache unit 12 and is similarly prepared for a possible request from the client side.

Figure 11:
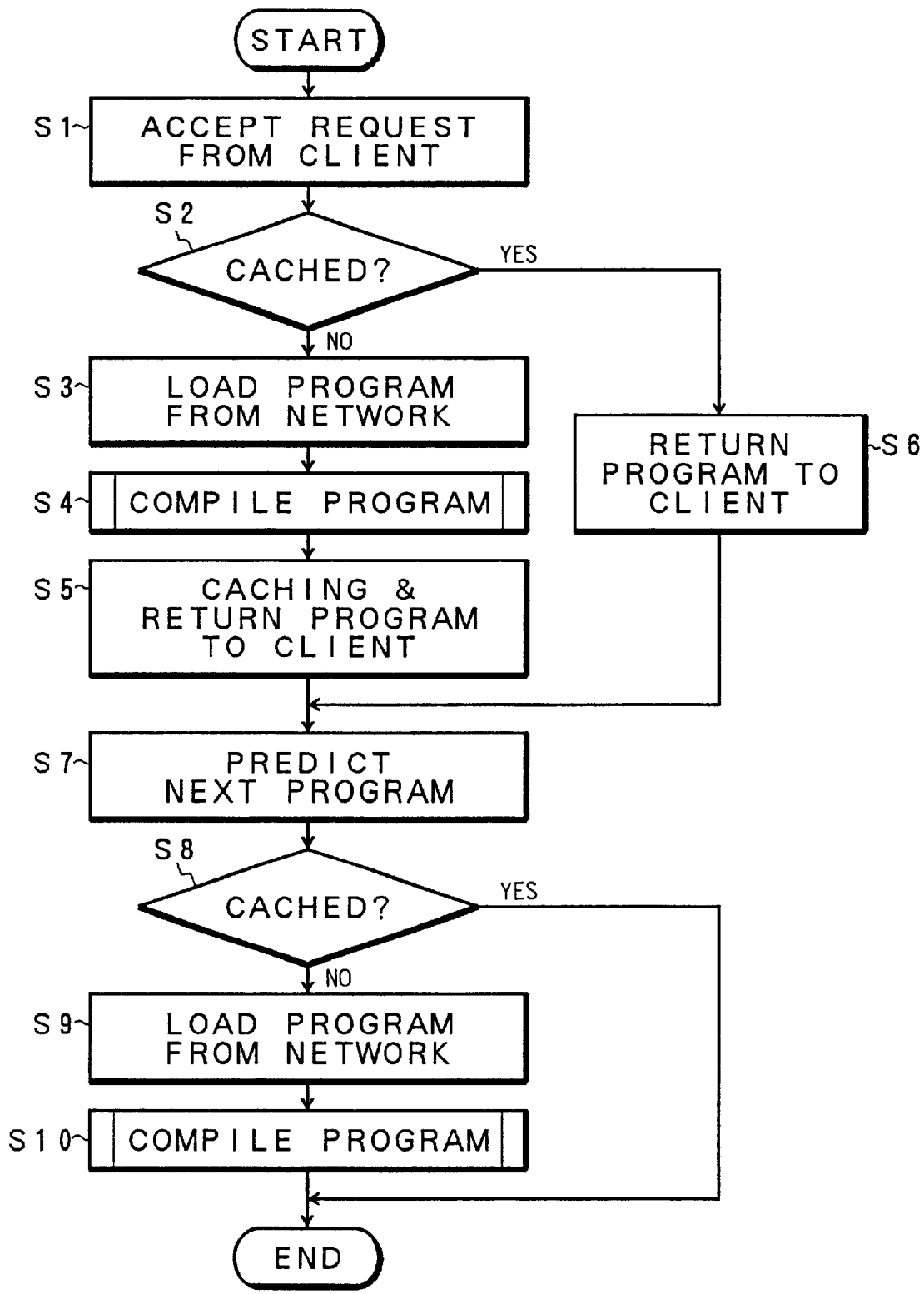
FIG. 11 is a flowchart of the processing actions effected by the substitute compile server, including compilation for predicting the program requested by the client.

FIG. 11 is a flowchart of the processing actions effected by the substitute compile server 10 of FIG. 2 upon the predication and compilation of the program to be next requested by the client based on the dynamic link 45 of FIG. 10. Steps S1 to S6 are prediction-free compilation processings based on the client request, which are the same as the steps S1 to S6 of FIG. 6. After the completion of the compilation processings, the dynamic link 45 is interpreted in step S7 to predict a program to be next requested by the client. After the completion of the prediction of the program, a check is made in step S8 to see whether the compilation results of the thus predicted program are cached in the cache unit 12. If not, the predicted Java program is loaded from the server 10 on the network in step S9, and the predicted Java program is compiled in step S10, after which caching for retaining the same in the cache unit 12 is carried out in step S11. In cases where the predicted Java program has already been compiled and cached in step S8, then the processings of the steps S9 to S11 are skipped.

Figure 12:
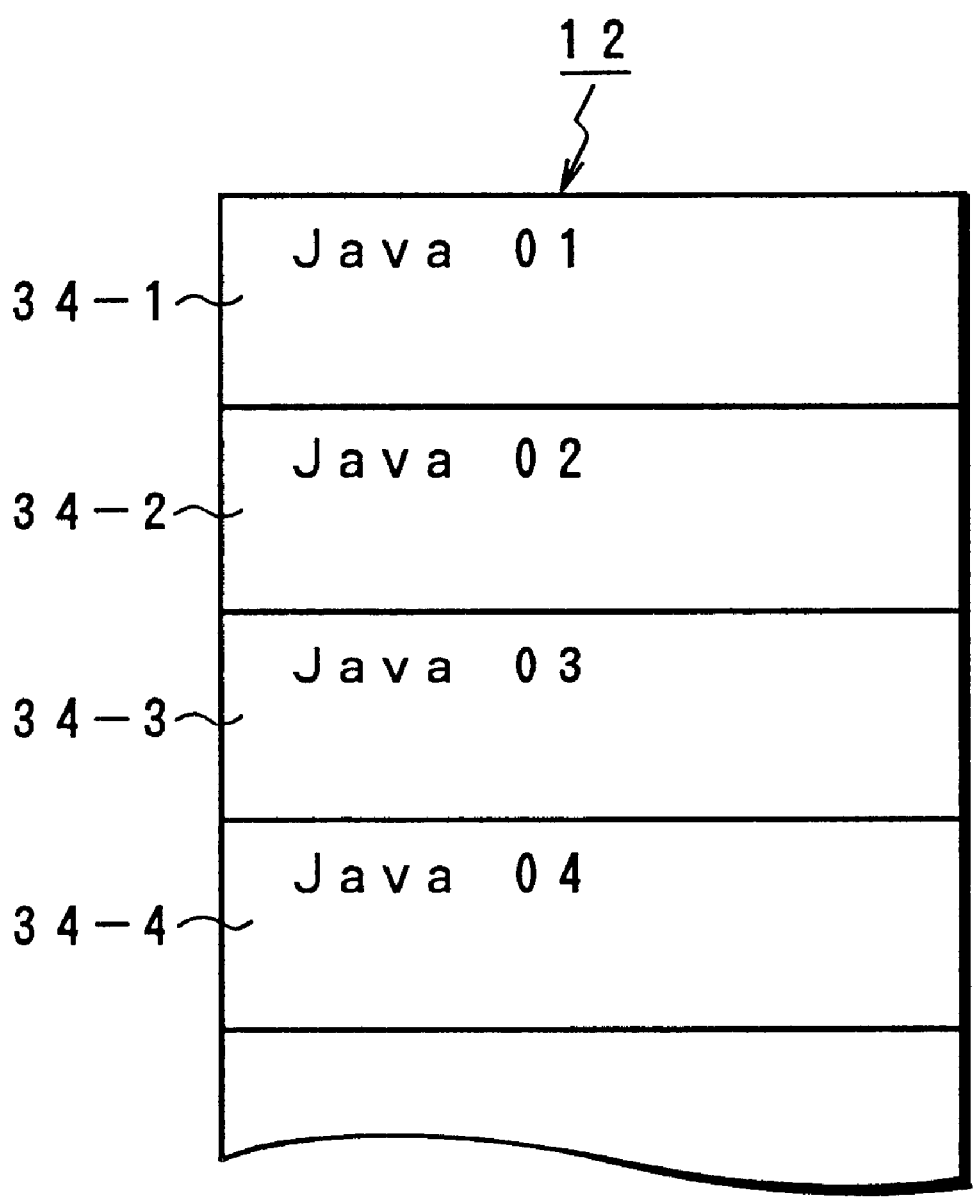
FIG. 12 is an explanatory diagram of a cache provided in the substitute compile server of FIG. 2, for intactly retaining a program received from the network.

FIG. 12 shows other cache contents of the cache unit 12 provided in the substitute compile server 10 of FIG. 2. This cache unit 12 is characterized in that it retains intactly precompiled Java programs 34-1 to 34-4 delivered from the Web server 20 on the network 18. Herein, in cases where the cache unit retains both the precompiled Java programs received from the Web server 20 on the network 18 and the compiled Java programs which have been compiled by the compile unit 28 as in the cache unit 12 of FIG. 3, the native code upon the compilation of the byte codes may have a relatively long code length, resulting in a larger proportion which the compiled Java programs occupy in the cache unit 12. Thus, as shown in FIG. 12, only the Java programs having juxtaposed precompiled byte codes are retained in the cache unit 12 whereas the Java programs of the native code resulting a longer compiled code length are not retained in the cache unit 12 whereby it is possible to reduce the capacity of the cache unit 12 used as hard disk.

Figure 13:
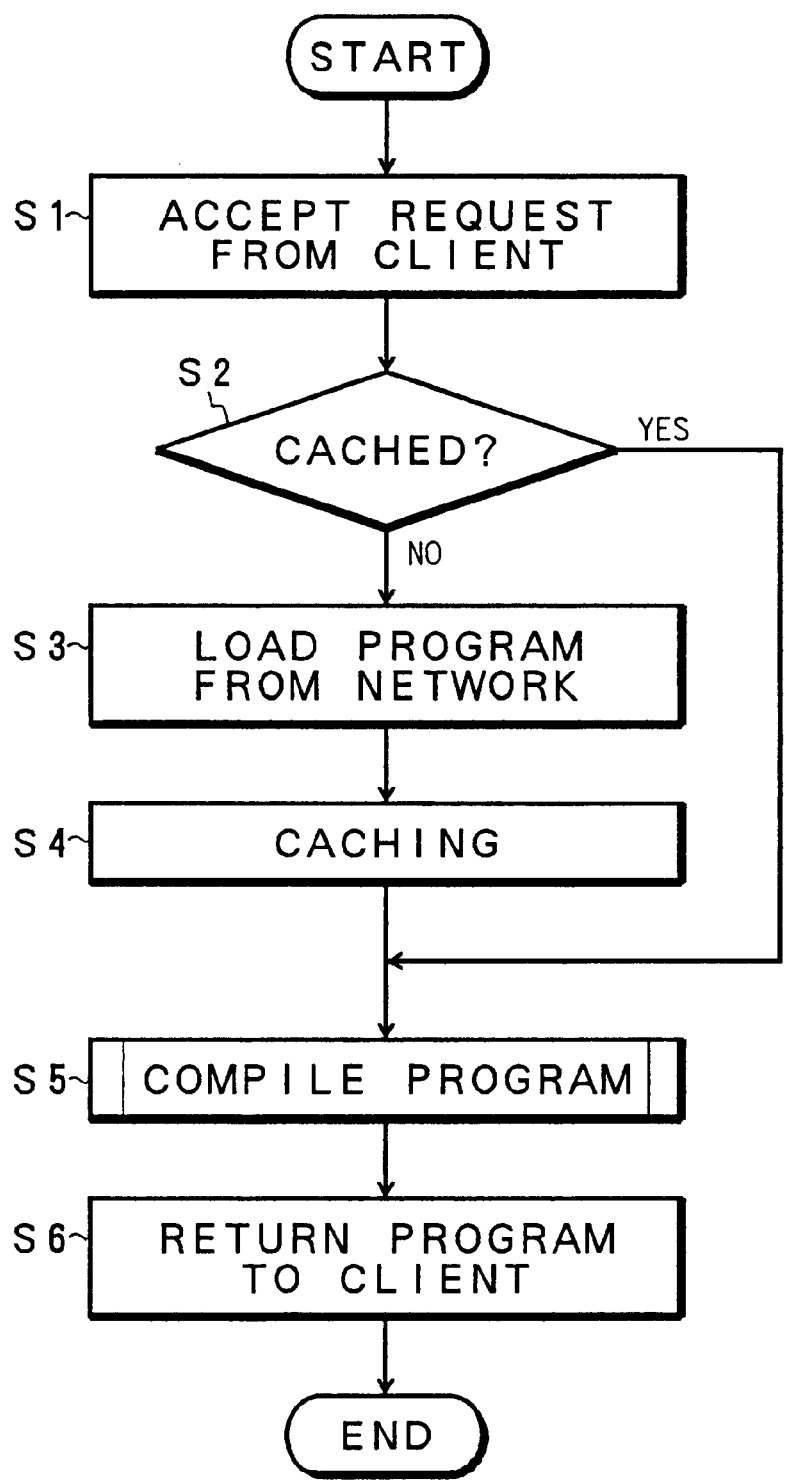
FIG. 13 is a flowchart of the processing actions effected by the substitute compile server of FIG. 3, using the cache of FIG. 12.

FIG. 13 is a flowchart of the processing actions effected by the substitute compile server 10 of FIG. 2 in the case of caching of only the precompiled Java programs of FIG. 12. In this embodiment, when a request for a program is accepted from the client in step S1, a check is made in step S2 to see whether the thus requested Java program has already been cached in the cache unit 12. If not, a program request is sent to the Web server 20 on the network 18 to load a Java program in step S3, and caching for retaining the Java program in the cache unit 12 is carried out in step S4, after which the Java program is compiled by the compile unit 28 into a Java program of a native code conforming to the execute form of the requester client in step S5. Then in step S6 the thus compiled Java program is returned to the client. In this embodiment as well not allowing the compiled Java programs to be cached, by caching the precompiled Java programs it is possible for the compile unit 28 to immediately compile the cached Java programs into the native code in response to the request from the client side without any request to the Web server 20 on the network 18, thus making the response to the client. For this reason, frequent compilation may result in an increase in processing time as compared with the processing of FIG. 6, whereas a less cache capacity enables the hardware configuration of the substitute compile server 10 to be simplified.

FIG. 14 is a flowchart of the case of caching only the precompiled Java programs of FIG. 12. In this event, similar to FIG. 10, the dynamic link 45 between the client files 42-1 to 42-4 and the applet 40 is analyzed upon compilation and return of the program in response to the request from the client, and then the Java program to be next requested by the client is predicted for compilation processing. In this processing as well, the steps S1 to S6 are the same as those in FIG. 13, although after the compilation and return of the client request program, a program to be next requested by the client is predicted on the basis of the analysis of the dynamic link 45 in step S7. Then a check is made in step S8 to see whether the predicted program has already been cached. If not, the predicted program is loaded from the Web server 20 on the network 18 in step S9 and is cached in the cache unit 12 in step S10. If it is judged in step S8 that the predicted program has already been cached, then the steps S9 and S10 are skipped. In this event as well, when a Java program is requested from the client side and is returned therefrom after compilation, by predicting and previously caching a Java program to be next requested it is possible for the substitute compile server 10 to immediately compile the request program in response to the client request upon the actual prediction hit. This enables the Java program execution time to be reduced by the time of access to the Web server 20 on the network.

According to the present invention as set forth hereinabove, the virtual machine computer program compiling function is imparted to the substitute server on the network to provide a substitute compile server, whereby it is possible to reduce the burden of the client which executes the virtual machine computer program on the network and it is possible for the client to execute the application program at a high speed under the network computer system. Furthermore, the substitute compile server is provided with the caching function so as to allow the cached virtual machine computer program compiled into the native code to be returned in response to the request from the client, whereby it is possible to reduce the time required for the return of the compiled program in response to the request from the client, to reduce the time taken from the program request on the network up to the execution thereof, with the result that a prompt execution of the application program in the client can be achieved. Furthermore, by virtue of the substitute compile server for compiling the virtual machine computer program into a native code for return, an execution speed equal to or higher than the machine having JIT compilers or the like can be achieved even by the small-scale client incapable of having the JIT compilers or the like.

Although the above embodiment has employed by way of example the JIT compiler as the compile unit 28 provided in the substitute compile server 10, a high-speed byte code compiler could be provided for translating the Java program on a class-to-class basis. The high-speed byte code compiler is suitable for the case of stand-alone application allowing the client side to act on the same machine at all times.

Furthermore, the compile unit 10 may be provided with JIT compilers adapted for applications easy to modify and update their functions and performing translation and optimization on a method-to-method basis and with high-speed byte code compilers suitable for the applications having fixed functions, whereby selection can be made depending on the application environment on the client side.

Although the above embodiment has employed by way of example the Java programs as the virtual machine computer programs on the network, it would be applicable intactly insofar as the programs on the network are intended to be compiled for the execution on the client side.

Furthermore, the present invention is directed to the substitute compile server 10 itself provided on the computer network, and specifically it can be implemented by imparting the JIT compiler functions to the Proxy server as in FIG. 1.

What is claimed is:

1. A network computer system comprising:
   a client for executing a virtual machine computer program lying on a network; and
   a substitute compile server for accepting said virtual machine computer program from said network in response to a request from said client, said substitute compile server compiling accepted said virtual machine computer program for the delivery to said client that has issued said request.

2. The system according to claim 1, wherein
   said substitute compile server, when having an execute form different from that of said client, compiles said virtual machine computer program in compliance with said execute form of said client.

3. The system according to claim 2, wherein
   said substitute compile server recognizes said execute form of said client in advance so that it compiles said virtual machine computer program in compliance with said execute form of said client that has issued said request.

4. The system according to claim 2, wherein
   said substitute compile server compiles said virtual machine computer program in compliance with an execute form requested by said client.

5. The system according to claim 2, wherein
   said substitute compile server, when accepting said virtual machine computer program from said network, performs compilations based on types of execute forms of connectable clients and delivers compiled programs having a plurality of execute forms to said client, said substitute compile server allowing said client that has issued said request to select a compiled program in conformity with its own execute form.

6. The system according to claim 1, wherein
   said substitute compile server delivers said compiled program to said client that has issued said request while simultaneously retaining the same on a cache, said substitute compile server delivering said compiled program retained on said cache in response to a request from said client.

7. The system according to claim 6, wherein
   said substitute compile server upon a request from said client predicts a virtual machine computer program to be next requested by said client and accepts the same from said network, said substitute compile server compiling said virtual machine computer program to be next requested, previous to retention on said cache.

8. The system according to claim 1, wherein said substitute compile server retains on a cache said virtual machine computer program received from said network so that upon a request from a client said substitute compile server compiles said virtual machine computer program retained on said cache and delivers the same to said client.

9. The system according to claim 8, wherein said substitute compile server upon a request from a client accepts from said network a virtual machine computer program requested as well as a virtual machine computer program predicted to be next requested by said client, said substitute compile server retaining two said virtual machine computer programs on said cache.

10. The system according to claim 1, wherein previous to said delivery, said substitute compile server compiles a byte code accepted in the form of said machine computer program into a native machine code conforming to an execute form of said client that has issued said request.

11. A substitute compile server comprising:

a controller for accepting, in response to a request from a client to execute a virtual machine computer program lying on a network, requested said computer program from said network; and a compile unit for compiling said program accepted by said controller, to deliver the same to said client that has issued said request.

12. A substitute compile server according to claim 11, further comprising a cache for retaining said program compiled by said compile unit so that upon a request from said client said compiled program retained thereon is delivered to said client that has issued said request.

* * * * *